United States Patent
Tria et al.

(10) Patent No.: US 10,669,467 B2
(45) Date of Patent: Jun. 2, 2020

(54) BETAINES FOR SHALE STABILIZATION

(71) Applicant: Halliburton Energy Services, Inc., Houston, TX (US)

(72) Inventors: Maria Celeste Rellamas Tria, Houston, TX (US); Catherine Martin Santos, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/549,908

(22) Filed: Aug. 23, 2019

(65) Prior Publication Data

US 2019/0375975 A1 Dec. 12, 2019

Related U.S. Application Data

(63) Continuation of application No. 15/572,131, filed as application No. PCT/US2015/034730 on Jun. 8, 2015, now Pat. No. 10,435,608.

(51) Int. Cl.
*C09K 8/04* (2006.01)
*E21B 21/00* (2006.01)

(52) U.S. Cl.
CPC .......... *C09K 8/04* (2013.01); *E21B 21/00* (2013.01); *C09K 2208/12* (2013.01); *E21B 21/003* (2013.01)

(58) Field of Classification Search
CPC ................................................. C09K 8/035
See application file for complete search history.

(56) References Cited

U.S. PATENT DOCUMENTS

| | | | |
|---|---|---|---|
| 4,999,054 A * | 3/1991 | Perovetz | C23C 18/44 106/1.05 |
| 5,908,814 A | 6/1999 | Patel et al. | |
| 6,904,972 B2 | 6/2005 | Zhang et al. | |
| 7,134,497 B1 | 11/2006 | Chatterji et al. | |
| 7,566,686 B2 | 7/2009 | Kippie et al. | |
| 8,020,617 B2 | 9/2011 | Shenoy et al. | |
| 8,507,413 B2 | 8/2013 | Wilson | |
| 2009/0078414 A1 * | 3/2009 | Horvath Szabo | E21B 43/16 166/263 |
| 2015/0344767 A1 | 12/2015 | Lei et al. | |

FOREIGN PATENT DOCUMENTS

| | | |
|---|---|---|
| EP | 668339 | 8/1995 |
| WO | 2003054352 | 7/2003 |
| WO | 2007066269 | 6/2007 |

(Continued)

OTHER PUBLICATIONS

"Surface modification of bentonites: I. Betaine montmorillonites and their rheological and colloidal properties" by C.U. Schmidt et al, published by Clay Minerals in 1999, 34, 447-458.

(Continued)

*Primary Examiner* — Angela M DiTrani Leff
*Assistant Examiner* — Avi T Skaist
(74) *Attorney, Agent, or Firm* — Tenley Krueger; C. Tumey Law Group PLLC

(57) ABSTRACT

Included are drilling fluids for drilling in a subterranean formation. A drilling fluid may include: an aqueous base fluid and a betaine shale stabilizer comprising glycine betaine HCl.

8 Claims, 1 Drawing Sheet

(56) References Cited

FOREIGN PATENT DOCUMENTS

WO 2016140689 9/2016

OTHER PUBLICATIONS

"Design and Development of Quaternary Amine Compounds: Shale Inhibition With Improved Environmental Profile" by Arvind D. Patel, published by the society of petroleum engineers in 2009, SPE 121737.
"Modified Poly-Amino Acid Hydration Suppressant Proves Successful in Controlling Reactive Shales" by J.R. Bruton et al., published by the society of petroleum engineers in 1993, SPE 26327.
International Search Report and Written Opinion for Application No. PCT/US2015/034730 dated Apr. 12, 2016.
Clayseal Plus Data Sheet from Halliburton Energy Services, Inc.
Clay Grabber Data Sheet from Halliburton Energy Services, Inc.
Aquagel Gold Seal Data Sheet from Halliburton Energy Services, Inc.
BaraSure W-499 Data Sheet from Halliburton Energy Services, Inc.
PHPA PreFlush Safety Data Sheet from Halliburton Energy Services, Inc.
Non-Final Office Action for U.S. Appl. No. 15/572,131 dated Jan. 11, 2019.
Notice of Allowance for U.S. Appl. No. 15/572,131 dated Jun. 3, 2019.

\* cited by examiner

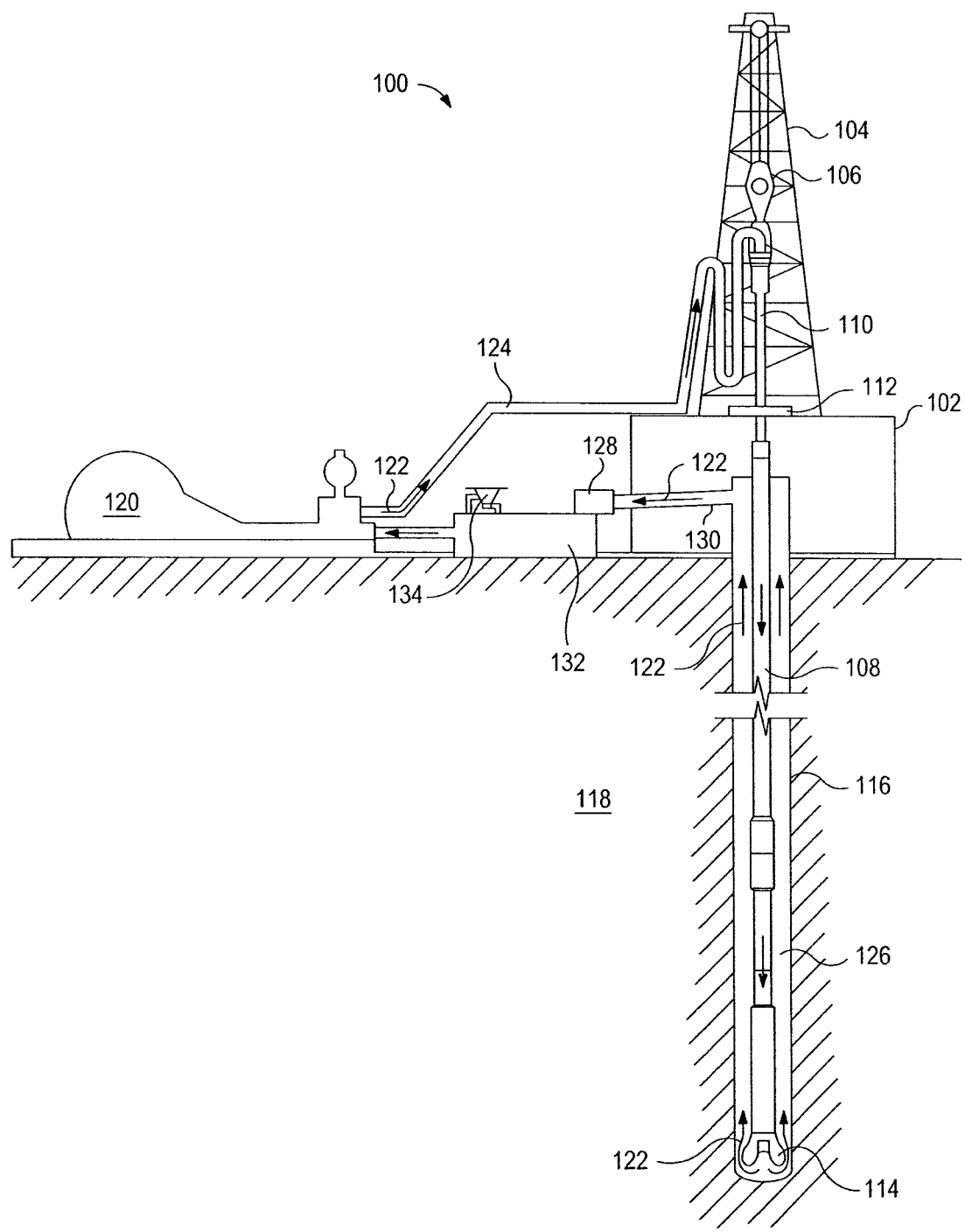

BETAINES FOR SHALE STABILIZATION

BACKGROUND

Provided are compositions and methods for water-based drilling fluids. More particularly, compositions and methods are provided for water-based drilling fluids comprising a betaine shale stabilizer.

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid may serve to transport wellbore cuttings up to the surface, cool the drill bit, and provide hydrostatic pressure on the walls of the drilled wellbore. Drilling fluids may be used in shale formations comprising water-swellable shales, which may also be referred to as water-swellable clays. As the water-swellable shales are exposed to water, they may swell and consequently increase wellbore pressure. On the extreme end, an increase in wellbore pressure may create a dangerous wellbore condition which could result in an explosion. Lesser increases in wellbore pressure may cause formation damage or may increase the drilling fluid viscosity to a point where further drilling becomes difficult.

To stabilize the water-swellable shales a variety of shale stabilizers may be added to the drilling fluid. Examples of shale stabilizers include short chain amines, polymeric amines (e.g., polyacrylamide), and quaternary ammonium ions. However, these shale stabilizers may be toxic at the concentrations necessary for shale stabilization, thus posing a risk to personnel and the environment. Further, the shale stabilizers may not be biodegradable and/or biocompatible. Thus, the shale stabilizers may pollute the environment, formation, water table, etc., which may lead to increased cleanup costs. Further, many of the aforementioned shale stabilizers are expensive and their cost may limit the types of wells that may be drilled and may also reduce overall profitability of the operation.

BRIEF DESCRIPTION OF THE DRAWINGS

These drawings illustrate certain aspects of some examples of the present invention, and should not be used to limit or define the invention.

FIG. 1 is a schematic diagram of an example drilling assembly.

DETAILED DESCRIPTION

Provided are compositions and methods for water-based drilling fluids. More particularly, compositions and methods are provided for water-based drilling fluids comprising a betaine shale stabilizer.

In examples, the disclosed drilling fluids may be water-based drilling fluids. The drilling fluids may be used in the drilling of subterranean formations, and may be particularly beneficial in the drilling of subterranean formations comprising water-swellable shales. The drilling fluids may comprise a betaine shale stabilizer as a drilling fluid additive. The betaine shale stabilizer may be non-toxic. The betaine shale stabilizer may be biodegradable. The betaine shale stabilizer may be biocompatible. The drilling fluids may comprise reduced shale stabilizer loading relative to other water-based drilling fluids comprising non-betaine shale stabilizers. In examples where the drilling fluids are used in operations to drill through subterranean formations comprising water-swellable shales, the betaine shale stabilizer may reduce the amount of swelling present in the water-swellable shales relative to drilling fluids that do not comprise betaine shale stabilizers. As a result, the amount of wellbore pressure during the drilling operation may be reduced relative to comparable drilling operations using drilling fluids that do not comprise betaine shale stabilizers. In optional examples, the drilling fluids may comprise other drilling fluid additives such as weighting agents.

As stated above, the drilling fluids comprise a betaine shale stabilizer. A betaine is a specific species of zwitterion comprising a neutral chemical compound with a positively charged cationic functional group which bears no hydrogen atom (e.g., a quaternary ammonium, phosphonium cation, etc.) and a negatively charged functional group (e.g., a carboxylate group) which may or may not be adjacent to the cationic site. Examples of betaines may include alkyl betaines, for example glycine betaine; branched betaines; betaine derivatives, for example, sulfobetaine and phosphobetaine; amine-functionalized betaines; the like, or a combination thereof. In some examples, the betaines may comprise short-chain betaines defined as betaines comprising a carbon number fewer than 10. In some examples, a single species of betaine shale stabilizer may be included in a drilling fluid. In alternative examples, multiple species of betaine shale stabilizers may be included in a drilling fluid. The betaine shale stabilizer may be present in the drilling fluids at a concentration in a range of about 0.1 pound per barrel ("lb/bbl") to about 10 lb/bbl. Where a barrel is 42 US gallons. For example, a betaine shale stabilizer may be present in a drilling fluid in a concentration of about 0.1 lb/bbl to 10 lb/bbl, 0.1 lb/bbl, about 0.5 lb/bbl, about 1 lb/bbl, about 2 lb/bbl, about 5 lb/bbl, about 7 lb/bbl, about 9 lb/bbl, or about 10 lb/bbl.

Without limitation by theory, a betaine shale stabilizer may inhibit, at least partially, the potentially swellability of water-swellable shales when these water-swellable shales are contacted by an aqueous-based drilling fluid comprising the betaine shale stabilizer. This effect may be due to the betaine shale stabilizer forming a barrier on the surface of the water-swellable shale which may prevent access to the water-swellable clay by water and may also selective interact with water to prevent the water from further interaction with the water-swellable shale. For example, the positively charged cationic functional group of the betaine may interact with the negatively charged surface of the water-swellable shale, thus blocking interaction between water and that specific site of the negatively charged surface of the water-swellable shale. Further, because water possesses a permanent dipole moment, this interaction may leave the negatively charged functional group of the betaine to potentially interact with the slight positive charge of the hydrogen atoms of a water molecule, which may prevent the interaction of the water with the negatively charged surface of the water-swellable shale. Therefore only the slight negative charge of the oxygen atom in the water molecule would be left free, and said slightly negative charged oxygen would be repelled from the negatively charged surface of the water-swellable shale. In examples comprising short-chain betaines comprising a carbon number fewer than 10, the betaines may be less likely to foam the drilling fluid and thus may reduce the need for defoamer or other techniques used to mitigate foam formation in the drilling fluid. In some embodiments, the drilling fluids may be non-foamed and as such may be provided such that foaming is not induced by mixing or by the addition of the betaine shale stabilizer or by any other component which may induce foaming. In some embodiments where foam is generated, the foam may be removed by the addition of defoamer or through any other component or technique used to remove foam in a drilling fluid.

In examples, the betaine shale stabilizer may be non-toxic at the concentrations used in the disclosed drilling fluids. Non-toxic is defined herein as a product that does not produce immediate personal injury or illness to humans when it is inhaled, swallowed, or absorbed through the skin. As such, the betaine shale stabilizer may be prepared for use in the disclosed drilling fluids with a reduced risk to personnel as compared to the use of toxic non-betaine shale stabilizers. The betaine shale stabilizer may be biodegradable at the concentrations used in the disclosed drilling fluids. Biodegradable is defined herein as any material which is capable of degradation by a microorganism or through any other biological means. The betaine shale stabilizer may biodegrade at varying rates dependent upon the species of betaine shale stabilizer chosen and the conditions present to induce biodegradation. Thus, the betaine shale stabilizer may be used during drilling operations and may be placed and/or disposed on the surface or within a subterranean formation, without a reduced risk of forming a permanent deposit of the betaine shale stabilizer on the surface or within the subterranean formation. The betaine shale stabilizer may be biocompatible at the concentrations used in the disclosed drilling fluids. Biocompatible is defined herein as the ability to be in contact with a living system (e.g., plants, animals, etc.) without producing an adverse effect. The betaine shale stabilizer may contact living systems without risk of damaging those systems and may therefore be used in operations and/or at concentrations in which other shale stabilizers may not be used. For example, the betaine shale stabilizer may be used in operations where the risk of and the potential damage caused by pollution may be elevated.

The drilling fluids may comprise an aqueous base fluid. The aqueous base fluid may be from any source provided that it does not contain an excess of compounds that may undesirably affect other components in the drilling fluids. For example, a drilling fluid may comprise fresh water or salt water. Salt water generally may include one or more dissolved salts therein and may be saturated or unsaturated as desired for a particular application. Seawater or brines may be suitable for use in some examples. Further, the aqueous base fluid may be present in an amount sufficient to form a pumpable slurry. In certain examples, the aqueous base fluid may be present in the drilling fluids in an amount in the range of from about 33% to about 100% by weight of the drilling fluids. In certain examples, the aqueous base fluid may be present in the drilling fluids in an amount in the range of from about 35% to about 70% by weight of the drilling fluids. One of ordinary skill in the art with the benefit of this disclosure will recognize the appropriate amount of aqueous base fluid for a chosen application.

The drilling fluids may additionally comprise drilling fluid additives. The drilling fluid additives may include, but are not limited to viscosifiers, non-betaine shale stabilizers, weighting agents, lost-circulation materials, pH buffers, thixotropic additives, defoaming agents, etc. In some examples, the drilling fluids may be substantially free of solids. Alternatively, in some examples, the drilling fluid may comprise solids. The solids may be any type of solids found in a wellbore or introduced into a wellbore fluid. Without limitation, examples of solids may include pieces of the formation, drill cuttings, and additives introduced to a drilling fluid, e.g., lost circulation materials, weighting agents, etc.

The drilling fluids may optionally include a viscosifier. The viscosifier may include, but is not limited to a substituted or unsubstituted polysaccharide; a substituted or unsubstituted polyalkenylene, wherein the substituted or unsubstituted polysaccharide or polyalkenylene is crosslinked or uncrosslinked; a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide; a crosslinked or crosslinkable gel; a poly(vinyl alcohol) homopolymer; poly(vinyl alcohol) copolymer; a crosslinked poly(vinyl alcohol) homopolymer; crosslinked poly(vinyl alcohol) copolymer; any other suitable viscosifier; and/or any combinations thereof. If present, the viscosifier is included in the drilling fluids in a concentration sufficient to achieve the desired result for a chosen application. With the benefit of this disclosure, one of ordinary skill in the art will be able to determine if a viscosifier is necessary, to choose an appropriate viscosifier, and to determine the appropriate concentration of the viscosifier used.

Weighting agents may be included in the drilling fluids. Weighting agents are typically materials that weigh more than water and may be used to increase the density of drilling fluids. By way of example, weighting agents may have a specific gravity of about 2 or higher (e.g., about 2, about 4, etc.). Examples of weighting agents that may be used include, but are not limited to, hematite, illmenite, hausmannite, barite, and combinations thereof. Specific examples of suitable weighting agents include HI-DENSE® weighting agent, available from Halliburton Energy Services, Inc. If present, the weighting agents are included in the drilling fluids in a concentration sufficient to achieve the desired result for a chosen application. With the benefit of this disclosure, one of ordinary skill in the art will be able to determine if a weighting agent is necessary, to choose an appropriate weighting agent, and to determine the appropriate concentration of the weighting agent used.

Lost-circulation materials may be included in the drilling fluids to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls. If present, the lost-circulation materials are included in the drilling fluids in a concentration sufficient to achieve the desired result for a chosen application. With the benefit of this disclosure, one of ordinary skill in the art will be able to determine if a lost-circulation material is necessary, to choose an appropriate lost-circulation material, and to determine the appropriate concentration of any lost-circulation materials used.

The drilling fluids may optionally comprise a pH buffer. Any pH buffer may be used to maintain the pH of the drilling fluids within a suitable range, for example, about 8 to about 10.5. Examples of pH buffers may include, but should not be limited to carbonates, bicarbonates, phosphates, hydroxides, and the like. If present, the pH buffer is included in the drilling fluids in a concentration sufficient to achieve the desired result for a chosen application. With the benefit of this disclosure, one of ordinary skill in the art will be able to determine if a pH buffer is necessary, to choose an appropriate pH buffer, and to determine the appropriate concentration of any pH buffer used.

Thixotropic additives may be included in the drilling fluids to, for example, provide a drilling fluid that may be a thin or low viscosity fluid when pumped or exposed to shear, however, if allowed to remain quiescent the drilling fluid may attain a relatively high viscosity. Among other things, thixotropic additives may be used to help control free water, create rapid gelation in the drilling fluids, combat lost circulation, prevent "fallback" in annular column, and minimize gas migration. Examples of suitable thixotropic additives include, but are not limited to gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof. If present, the thixotropic additives are included in the drilling fluids in a concentration sufficient to achieve the desired result for a chosen application. With the benefit of this disclosure, one of ordinary skill in the art will be able to determine if a thixotropic additive is necessary, to choose an appropriate thixotropic additive, and to determine the appropriate concentration of any thixotropic additive used.

Optionally, defoaming additives may be included in the drilling fluids to, for example, reduce the tendency of the drilling fluids to foam during mixing and/or transfer. Examples of suitable defoaming additives include, but are not limited to, polyol silicone compounds. Suitable defoaming additives are available from Halliburton Energy Services, Inc., under the product name D-AIR™ defoamers. If present, the defoaming additives are included in the drilling fluids in a concentration sufficient to achieve the desired result for a chosen application. With the benefit of this disclosure, one of ordinary skill in the art will be able to determine if a defoaming additive is necessary, to choose an appropriate defoaming additive, and to determine the appropriate concentration of any defoaming additive used.

The drilling fluids may be substantially free or free of added clays. "Added" clays are defined herein as clays added to the drilling fluids prior to introduction of the drilling fluids in a subterranean formation. Examples of added clays may include, but are not limited to montmorillonite, kaolite, or hectorite. In some examples, the drilling fluids may consist essentially of the betaine shale stabilizer and an aqueous base fluid. One of ordinary skill in the art with the benefit of this disclosure will recognize whether the drilling fluids should be free of or substantially free of added clays.

The drilling fluids may comprise a density sufficient for drilling through a target subterranean formation. The density of the drilling fluids may be altered by the addition of drilling fluid additives (e.g., weighting agents) as disclosed above. The correct density to use for a drilling operation may be determined by a variety of factors, one of which may include the subterranean formation pressure. The density of the drilling fluids may be any density in a range of 8 pounds per gallon ("ppg") to 20 ppg. For example, the density of the drilling fluids may be 8 ppg, 10 ppg, 12 ppg, 15 ppg, 18 ppg, or 20 ppg.

A method for drilling in a subterranean formation is disclosed. The method may comprise providing a drilling fluid comprising an aqueous base fluid and a betaine shale stabilizer; placing the drilling fluid into the subterranean formation; and drilling a wellbore in the subterranean formation. The drilling fluid may comprise the betaine shale stabilizer in an amount in a range of about 0.5 lb/bbl to about 10 lb/bbl. The drilling fluid may comprise the betaine shale stabilizer in an amount in a range of about 2 lb/bbl to about 7 lb/bbl. The betaine shale stabilizer may be selected from the group consisting of alkyl betaines, amine functionalized betaines, branched betaines, betaine derivatives, and any combination thereof. The betaine shale stabilizer may be glycine betaine HCl. The aqueous base fluid may be present in the drilling fluid in an amount in the range of from about 33% to about 100% by weight of the drilling fluid. The subterranean formation may comprise a water-swellable shale. The drilling fluid may not be foamed. The betaine shale stabilizer may possess one property selected from the group consisting of non-toxic, biodegradable, biocompatible, and combinations thereof.

A method for drilling in a subterranean formation is disclosed. The method may comprise preparing a drilling fluid comprising an aqueous base fluid and a betaine shale stabilizer; circulating the drilling fluid into the subterranean formation, wherein the subterranean formation comprises a water-swellable shale; drilling a wellbore in the subterranean formation while circulating the drilling fluid; and contacting the water-swellable shale with the drilling fluid. The drilling fluid may comprise the betaine shale stabilizer in an amount in a range of about 0.5 lb/bbl to about 10 lb/bbl. The drilling fluid may comprise the betaine shale stabilizer in an amount in a range of about 2 lb/bbl to about 7 lb/bbl. The betaine shale stabilizer may be selected from the group consisting of alkyl betaines, amine functionalized betaines, branched betaines, betaine derivatives, and any combination thereof. The betaine shale stabilizer may be glycine betaine HCl. The aqueous base fluid may be present in the drilling fluid in an amount in the range of from about 33% to about 100% by weight of the drilling fluid. The subterranean formation may comprise a water-swellable shale. The drilling fluid may not be foamed. The betaine shale stabilizer may possess one property selected from the group consisting of non-toxic, biodegradable, biocompatible, and combinations thereof.

A drilling system is disclosed. The drilling system may comprise a drilling fluid. The drilling fluid may comprise an aqueous base fluid and a betaine shale stabilizer. The drilling system may further comprise a drilling assembly; a drill string coupled to the drilling assembly; and a pumping system fluidically coupled to the drill string, wherein the pumping system is capable of pumping the drilling fluid through the drill string. The drilling fluid may comprise the betaine shale stabilizer in an amount in a range of about 0.5 lb/bbl to about 10 lb/bbl. The drilling fluid may comprise the betaine shale stabilizer in an amount in a range of about 2 lb/bbl to about 7 lb/bbl. The betaine shale stabilizer may be selected from the group consisting of alkyl betaines, amine functionalized betaines, branched betaines, betaine derivatives, and any combination thereof. The betaine shale stabilizer may be glycine betaine HCl. The aqueous base fluid may be present in the drilling fluid in an amount in the range of from about 33% to about 100% by weight of the drilling fluid. The drilling system may be used to drill into a subterranean formation. The subterranean formation may comprise a water-swellable shale. The drilling fluid may not be foamed. The betaine shale stabilizer may possess one property selected from the group consisting of non-toxic, biodegradable, biocompatible, and combinations thereof.

FIG. 1 illustrates an example drilling assembly 100 in which a drilling fluid 122 comprising a betaine shale stabilizer as disclosed above is used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

Drilling fluid 122 comprising a betaine shale stabilizer may be prepared. Drilling fluid 122 may be prepared by combining an aqueous base fluid with a betaine shale stabilizer. The aqueous base fluid and the betaine shale stabilizer may be mixed in any suitable mixer (11,000 rpm), or may be mixed inline using a pump (e.g., pump 120). Pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the drilling fluid 122.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the disclosure, the following examples of certain aspects of some embodiments are given. In no way should the following examples be read to limit, or define, the entire scope of the embodiments.

Example 1

A bentonite hydration test was performed to evaluate the rheology and filtration control of neat materials. Three different comparative sample shale inhibitors, designated Samples 1-3, were prepared using 350 mL of fresh water and 30 g of bentonite (a water-swellable shale). Sample 1 did not comprise a shale stabilizer and nothing further was added to it. Sample 2 comprised 1 g of glycine betaine HCl shale stabilizer to provide a loading of 1 lb/bbl. Sample 3 comprised 7 g of glycine betaine HCl shale stabilizer to provide a loading of 7 lb/bbl. Sample 4 was a comparative example and comprised 7 g of an alkyl amine shale stabilizer to provide a loading of 7 lb/bbl. The alkyl amine shale stabilizer is approximately 32-35% active. Thus, a loading of 7 lb/bbl of the alkyl amine shale stabilizer is roughly equivalent to a loading of ~2.25-2.5 lb/bbl of the glycine betaine HCl. The samples were then mixed for 45 minutes. After preparation, the rheologies of the three samples were determined at room temperature using a Model 35A FANN® Viscometer, in accordance with the procedure set forth in API RP Practice 13B-1, Recommended Practice for Field Testing of Water-Based Drilling Fluids. The rheology was then measured at room temperature. After testing the rheology, the fluid samples aged 30 minutes and the filtration control was measured using a static filter press at 100 psi in accordance with the procedure set forth in API RP Practice 13B-1, Recommended Practice for Field Testing of Water-Based Drilling Fluids. A barrel is 42 US gallons. The data is presented in Table 1 below.

TABLE 1

Rheology and Filtration Testing

| Viscometer Readings | Sample 1 | Sample 2 | Sample 3 | Sample 4 |
|---|---|---|---|---|
| 600 | 75 | 24 | 8 | 67 |
| 300 | 69 | 19 | 5 | 57 |
| 6 | 52 | 12 | 3 | 35 |
| 3 | 52 | 12 | 3 | 35 |
| Yield Point | 63 | 14 | 2 | 47 |
| Filtration, mL | 10.4 | 19 | 295 | 24 |

As indicated in Table 1 below, the addition of betaine to the aqueous bentonite mixture resulted in thinner fluids relative to the control. Therefore, the control experienced a greater degree of clay swelling induced thickening. The same result was shown as compared to the alkyl amine shale stabilizer but to a lesser extent. The betaine shale stabilizer also showed a greater degree of collected filtrate, which is a further indication that bentonite clay swelling has been inhibited.

Example 2

The following comparative formulations were carried out to evaluate to evaluate the efficacy of a betaine shale stabilizer in controlling the erosion of shale. The results are indicated in Table 3 below.

The following components were used to create six drilling fluid samples, designated samples 4-9: tap water, caustic soda, pregelatinized starch, carboxymethylcellulose, xanthan gum, barite, and an oxygen scavenger. The specific formulations of each component of the sample drilling fluids are provided in Table 2 below. Sample 4 did not contain a shale stabilizer. Sample 5 contained an alkyl amine shale stabilizer at a loading of 7 lb/bbl. Sample 6 contained a glycine betaine HCl shale stabilizer at a loading of 7 lb/bbl. Sample 7 contained a glycine betaine HCl shale stabilizer at a loading of 2.25 lb/bbl. Sample 8 contained a glycine betaine HCl shale stabilizer at a loading of 2.5 lb/bbl. Sample 9 contained a glycine betaine HCl shale stabilizer at a loading of 2.25 lb/bbl, however, the pH of the drilling fluid was adjusted to 10. The densities of the drilling fluid samples were 10.8 lb/bbl. The alkyl amine shale stabilizer is approximately 32-35% active. Thus, a loading of 7 lb/bbl of the alkyl amine shale stabilizer is roughly equivalent to a loading of ~2.25-2.5 lb/bbl of the glycine betaine HCl. A barrel is 42 US gallons.

TABLE 2

Sample Formulations

| Formulation Component | Amount (lb.) | Mix Time (min.) |
|---|---|---|
| Tap Water | 315 | — |
| Caustic Soda | 0.2 | 5 |
| Pregelatinized Starch | 4 | 7 |
| Carboxymethylcellulose | 2 | 7 |
| Xanthan Gum | 1.25 | 15 |
| Barite | 131 | 5 |
| Oxygen Scavenger | 0.1 | 1 |
| Shale Stabilizer | As Specified | 5 |

After preparation, 25 g of London clay (a water-swellable shale) was added to the drilling fluid samples. The drilling fluid samples were then hot-rolled at 150° F. for 16 hours. The London clay was then filtered from the drilling fluid samples using the mesh used for sizing the London clay. The London clay was then rinsed carefully with fresh water to remove the barite and any other residual drilling fluid components. The London clay was then dried at 225° F. to evaporate any water. The final dried London clay was then weighed. The data is presented in Table 3 below.

TABLE 3

Shale Erosion Results

| Sample | % Shale Recovery |
|---|---|
| Sample 4 (Control) | 20 |
| Sample 5 (Alkyl Amine 7 lb/bbl) | 93 |
| Sample 6 (Glycine Betaine HCl 7 lb/bbl) | 97 |
| Sample 7 (Glycine Betaine HCl 2.25 lb/bbl) | 90 |
| Sample 8 (Glycine Betaine HCl 2.5 lb/bbl) | 94 |
| Sample 9 (Glycine Betaine HCl 2.25 lb/bbl, pH of 10) | 90 |

Example 2 thus indicates that the betaine shale stabilizer is able to control shale erosion as well as the alkyl amine shale stabilizer. As mentioned above, the betaine shale stabilizer is also more economical and also non-toxic, biodegradable, and biocompatible unlike the alkyl amine shale stabilizer.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A composition comprising:
    an aqueous base fluid comprising a brine, wherein the aqueous base fluid is present in an amount of about 33 wt. % to about 100 wt. % of the composition;
    a betaine shale stabilizer, the betaine comprising glycine betaine HCl;
    a weighting agent selected from the group consisting of hematite, illmenite, hausmannite, barite, and combinations thereof; and
    a pH buffer present in an amount such that the composition has a pH in a range of about 8 to about 10.5;
    wherein the composition is a drilling fluid.

2. The composition of claim 1 wherein the drilling fluid comprises the betaine shale stabilizer in an amount in a range of about 0.5 lb/bbl to about 10 lb/bbl.

3. The composition of claim 1 wherein the drilling fluid comprises the betaine shale stabilizer in an amount in a range of about 2 lb/bbl to about 7 lb/bbl.

4. The composition of claim 1 wherein the betaine shale stabilizer further comprises at least one betaine selected from the group consisting of alkyl betaines, amine functionalized betaines, branched betaines, betaine derivatives, and any combination thereof.

5. The composition of claim 1 wherein the betaine shale stabilizer possesses one property selected from the group consisting of non-toxic, biodegradable, biocompatible, and combinations thereof.

6. The composition of claim 1 wherein the drilling fluid further comprises at least one drilling fluid additive selected from the group consisting of non-betaine shale stabilizers, lost-circulation materials, thixotropic additives, defoaming agents, and combinations thereof.

7. The composition of claim 1 further comprising a thixotropic additive selected from the group consisting of gypsum, water soluble carboxyalkyl, hydroxyalkyl, mixed carboxyalkyl hydroxyalkyl either of cellulose, polyvalent metal salts, zirconium oxychloride with hydroxyethyl cellulose, and combinations thereof.

8. The composition of claim 1 further comprising a polyol silicone compound.

* * * * *